Figures 1, 2:
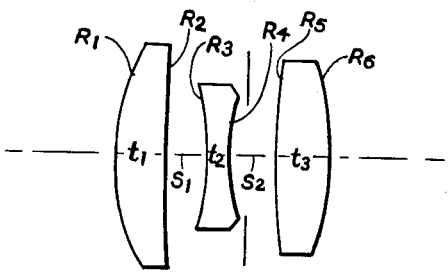

Oct. 9, 1962     F. E. ALTMAN ET AL     3,057,260

TRIPLET LENS

Filed Aug. 1, 1961

| EQUIVALENT FOCAL LENGTH=100mm | | | | | f/3.9 |
|---|---|---|---|---|---|
| LENS | N | V | RADII mm. | SPACING mm. | THICKNESSESS mm. |
| 1 | 1.70 | 56 | $R_1$ = 40.2<br>$R_2$ = 1330 | | $t_1$ = 9.2 |
| | | | | $S_1$ = 6.3 | |
| 2 | 1.65 | 34 | $R_3$ = -82.1<br>$R_4$ = 37.7 | | $t_2$ = 5.0 |
| | | | | $S_2$ = 9.0 | |
| 3 | 1.73 | 51 | $R_5$ = 155<br>$R_6$ = -64.6 | | $t_3$ = 9.0 |

Fred E. Altman
Laura W. Von Halla
      INVENTORS

BY R. Frank Smith
    F. M. Emerson Holmes
           ATTORNEYS

United States Patent Office 3,057,260
Patented Oct. 9, 1962

3,057,260
TRIPLET LENS
Fred E. Altman and Laura W. Von Halla, Rochester, N.Y., assignors to Eastman Kodak Company, Rochester, N.Y., a corporation of New Jersey
Filed Aug. 1, 1961, Ser. No. 128,450
1 Claim. (Cl. 88—57)

This invention relates to photographic objectives of the type consisting of three simple airspaced elements of which the inner one is biconcave and the outer two are positive in power.

An object of the invention is to provide a fully corrected improved triplet covering a wide angular field at a moderately high aperture ratio.

Another object of the invention is to provide such a triplet lens which is economical to manufacture.

According to the present invention the above objects are achieved by using glasses having refractive indices and dispersive indices higher in all three lens elements than the average of known objectives, by making the front element meniscus rather than plano convex or biconvex, and by making the front airspace smaller than is usual in such objectives.

Objectives are known in which the lens elements are made of high-index glass, but the dispersive indices V are then lower than in the present invention. Similarly, objectives in which the dispersive indices are relatively high have accompanying low refractive indices. According to the present invention, both refractive and dispersive indices are kept high. The use of a meniscus front element and a short front airspace in combination with glasses of this nature permits achievement simultaneously of a wide field angle and moderately large aperture. In known triplet objectives one or the other of these desirable characteristics must yield, because measures which improve one tend to detract from the other. By using the principle of my invention this difficulty is overcome.

An objective according to the invention and a preferred embodiment are shown in the drawings.

FIG. 1 shows a cross-sectional view of the objective of my invention with the longer conjugate side on the left; and FIG. 2 is a table of constructional data for a preferred embodiment of the invention.

I have found that particular ranges of refractive index and dispersive index, and particular relationships of these indices among the three lenses give better results than other ranges and relationships. These may be summarized in the following inequalities:

$$1.647 < N_2 < 1.695 < N_1 < N_3 < 1.740$$
$$56 \leq V_1 < 60$$
$$33 < V_2 < 36$$
$$50 < V_3 < 54$$

where N is the index of refraction of the glasses for D light, V is the dispersive index of the glasses, and the subscripts number the lenses consecutively from front to rear, i.e. from the longer conjugate side to the shorter conjugate side of the objective.

I have further found that the front airspace of the objective must preferably be kept between 0.05 and 0.065 times the equivalent focal length of the objective.

The invention, using glasses and airspace as defined above, is best carried out when the radii of curvature of the lens surfaces fall within ranges expressed in the following inequalities:

$$0.364F < R_1 < 0.445F$$
$$12.1F < R_2 < 14.8F$$
$$-1.02F < R_3 < -0.768F$$
$$0.337F < R_4 < 0.412F$$
$$1.40F < R_5 < 1.71F$$
$$-0.695F < R_6 < -0.578F$$

where the surfaces are numbered consecutively from front to rear by subscripts, positive values of radius denote surfaces convex to the front, and negative values of radius denote surfaces concave to the front.

In FIG. 1, the interrupted line in airspace $s_2$ shows the approximate location of a diaphragm stop, if one is desired.

Constructional values of a preferred embodiment of the invention are as shown in FIG. 2 and repeated in the table below for convenience.

TABLE I

Equivalent focal length=100 mm.  f/3.9

| Lens | N | V | Radii, mm. | Spacing, mm. | Thicknesses, mm. |
|---|---|---|---|---|---|
| 1 | 1.70 | 56 | $R_1=40.2$ $R_2=1,330$ | $s_1=6.3$ | $t_1=9.2$ |
| 2 | 1.65 | 34 | $R_3=-82.1$ $R_4=37.7$ | $s_2=9.0$ | $t_2=5.0$ |
| 3 | 1.73 | 51 | $R_5=155$ $R_6=-64.6$ | | $t_3=9.0$ |

The first column gives the lens elements numbered in order from front to rear, N is the index of refraction for the D line of the spectrum, V is the dispersive index, R, t, and s refer respectively to the radii of curvature of the refractive surfaces, the thicknesses of the elements, and the airspaces between the elements, the subscripts denote surfaces, elements and airspaces numbered consecutively from front to rear, and the + and − signs in the fourth column correspond to surfaces which are respectively convex and concave to the front.

The data are given for an objective having an equivalent focal length of 100 mm., but to make a different focal length objective it is only necessary to scale all dimensions in the same proportion.

An objective constructed according to these data has a field half-angle of 28° and a maximum relative aperture of f/3.5, thus achieving these objects of the invention.

The invention has been described in detail with particular reference to preferred embodiments thereof, but it will be understood that variations and modifications can be effected within the spirit and scope of the invetion as described herinabove and as defined in the appended claim.

We claim:

A photographic objective constructed in proportions substantially as specified in the following table:

| Lens | N | V | Radii | Spacings | Thicknesses |
|---|---|---|---|---|---|
| 1 | 1.70 | 56 | $R_1=.402F$ $R_2=13.30F$ | $s_1=.063F$ | $t_1=.092F$ |
| 2 | 1.65 | 34 | $R_3=-.821F$ $R_4=.377F$ | $s_2=.090F$ | $t_2=.050F$ |
| 3 | 1.73 | 51 | $R_5=1.55F$ $R_6=-.646F$ | | $t_3=.090F$ | where F is the equivalent focal length of the objective and the first column gives the lens elements numbered in order from front to rear, N is the index of refraction for the D line of the spectrum, V is the dispersive index, R, t, and s refer respectively to the radii of curvature of the refractive surfaces, the thicknesses of the elements, and the airspaces between the elements, the subscripts denote surfaces, elements and airspaces numbered consecutively from front to rear, and the + and − signs in the fourth column correspond to surfaces which are respectively convex and concave to the front.

References Cited in the file of this patent

UNITED STATES PATENTS

| | | |
|---|---|---|
| 2,391,114 | Aklin | Dec. 18, 1945 |
| 2,731,884 | Brendel | Jan. 24, 1956 |
| 2,829,559 | Lautenbacher | Apr. 8, 1958 |